UNITED STATES PATENT OFFICE.

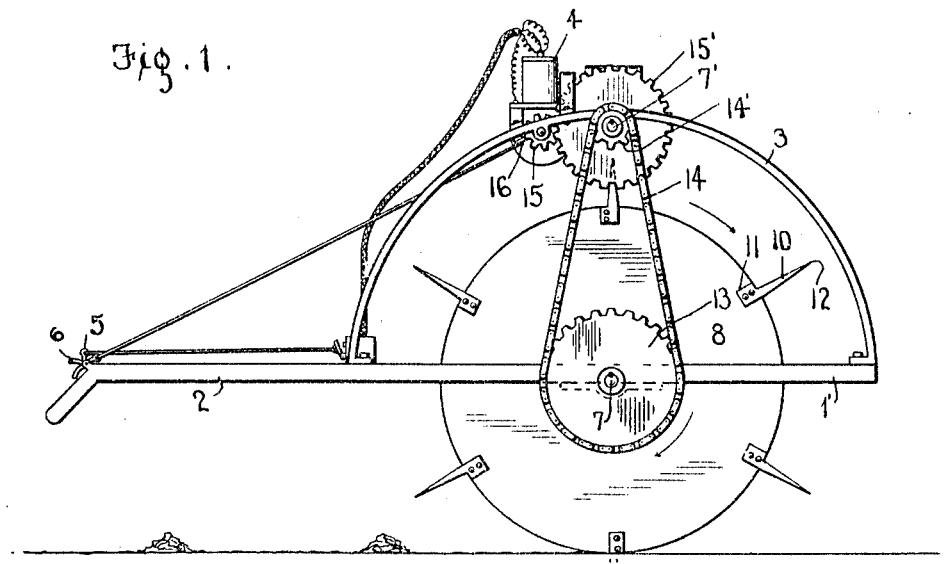
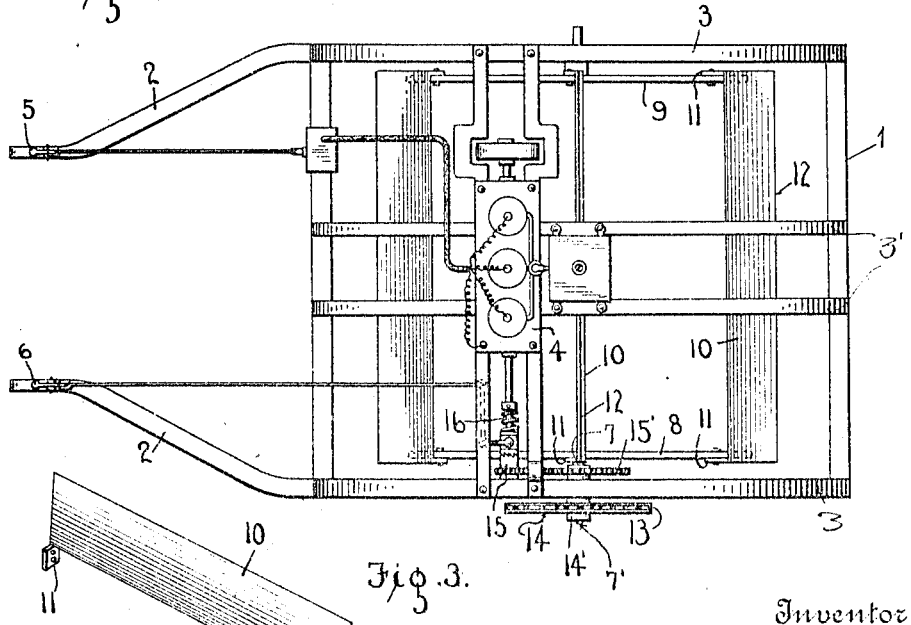

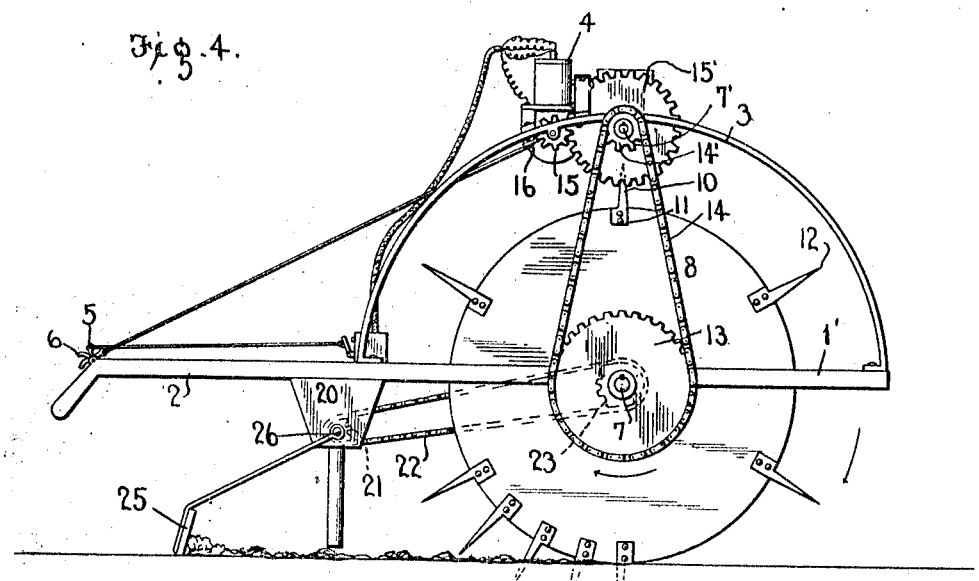
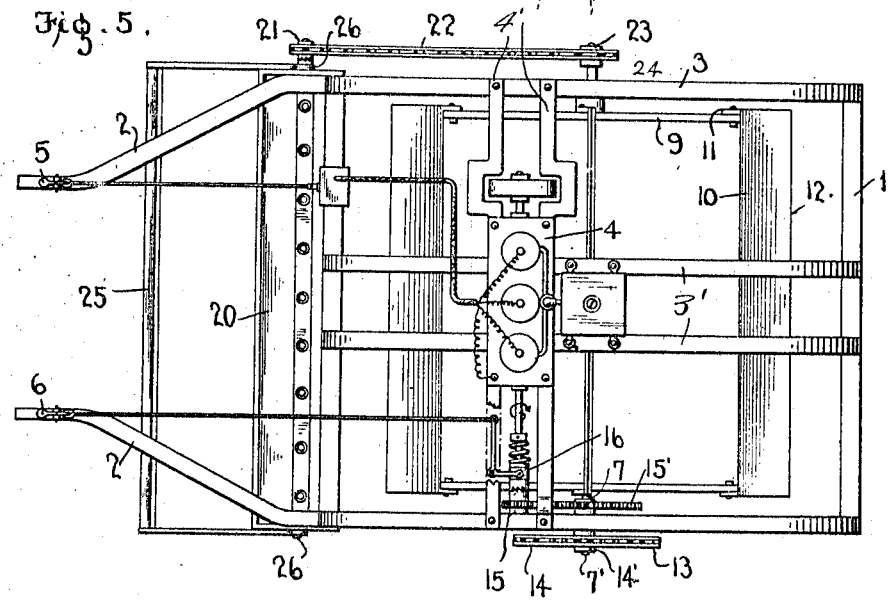

JOSIAH STARRIETT, OF LAKESIDE, CALIFORNIA.

REVOLVING PLOW.

1,084,908.  Specification of Letters Patent.  Patented Jan. 20, 1914.

Application filed February 26, 1912. Serial No. 679,894.

*To all whom it may concern:*

Be it known that I, JOSIAH STARRIETT, a citizen of the United States, residing at Lakeside, in the county of San Diego and State of California, have invented certain new and useful Improvements in Revolving Plows; and I do declare the following to be a full, clear, and exact description of the invention, such as will enable others skilled in the art to which it appertains to make and use the same.

This invention relates to plows, and more especially to those which revolve; and the object of the same is to produce a machine of this kind by the use of which a field or garden may be plowed for broadcast seed sowing or the like, an already plowed field may be harrowed, or—by the addition of attachments—wheat and seed may be sowed broadcast or drilled into the ground. These and other objects are accomplished by constructing the machine as hereinafter more fully described and claimed, and as shown in the drawings wherein—

Figure 1 is a side elevation and Fig. 2 a plan view of this improved plow in its simpler form; and Fig. 3 is a perspective detail of one of the blades or cutters. Figs. 4 and 5 are respectively a side elevation and a plan view of the same machine with the seeding attachments added, the cutter at one point being shown as provided with blades set nearer together for a purpose which will appear.

In the drawings the numerals 1 designate the cross bars and 1' the side bars of a light rectangular frame having two rearwardly converging handles 2 projecting from its rear corners, 3 are the endmost and 3' the intermediate straps of an arched superstructure supported by this frame, 4 is a gas engine mounted on cross bars 4' forming part of the superstructure, and 5 and 6 are the spark and clutch levers respectively carried by the handles as shown.

The numeral 7 designates an axle journaled in the frame and supporting the tractor wheel. In the present case the latter is composed of disks 8 and 9 fast on said axle near its journals, and sheet metal blades 10 extending from one disk to the other and having ears 11 at their inner corners bolted to the disks while their outer edges 12 are sharpened as shown in Fig. 3. A sprocket wheel 13 fast on one end of the axle 7 is connected by a chain belt 14 with a small sprocket wheel 14' on a counter shaft 7' journaled in the superstructure, and a large gear 15' on the counter shaft meshes with a small driving gear 15 on the shaft of the engine 4, and 16 is a clutch mechanism actuated by the clutch lever 6 to connect the driving gear 15 with the shaft or disconnect it therefrom at the will of the operator.

The machine as thus far described is a revolving plow or harrow, and its parts will be of such material, size, proportion and disposition that it will be nearly balanced over the tractor which comprises the two disks and the blades connecting them, and a single operator may easily manipulate or control the machine and steer it as one would operate a horse-drawn plow or cultivator. Taking his place between the handles and starting the engine, when he throws in the clutch the power is communicated to the axle and thence to the tractor and the latter revolves slowly over the earth in the direction indicated by the arrow, its blades entering the earth so as to plow, harrow or spade the same according to the kind of blades employed and their number. With about six blades as shown in Fig. 1, the earth will be spaded in transverse rows or furrows as indicated; but if more are employed as shown at the bottom of Fig. 4, the earth will be harrowed as indicated in that view. I need not amplify the possible results which may be obtained by the use of blades of different shapes, although I reserve the right to use them. When the engine is running at a moderate speed the tractor or cutter wheel is rotating slowly and drawing the entire machine over the ground so that the operator does not have to push. In order to stop he has but to throw out the clutch so as to disconnect the engine from the cutter wheel, or throw out the spark lever and stop the engine entirely. If he desires to back the machine, he has but to depress the clutch lever 6 with his right thumb so as to disconnect the engine entirely from the cutter wheel, and then draw the entire machine rearward by stepping backward in a manner which will be clear.

In Figs. 4 and 5 I have shown an amplification of this machine so that it may be used as a seeder. Any suitable form of seeding mechanism 20 is attached to this frame at about the position shown, the mechanism illustrated being only typical of what might be employed. Its seed dropper may have a sprocket 21 connected by a chain 22 with another sprocket 23 removably mounted on one end of the axle 7 which may be squared as at 24 for that purpose, and when the axle rotates the seed are sowed either broadcast or through drills according to the type of seeding mechanism employed. A coverer 25 is by preference pivotally connected as at 26 to the seeding mechanism and trails behind the same to cover the seed dropped, and here again the coverer illustrated is only typical of what might be employed although I emphasize the point that it should not sustain the handle end of the frame and it is preferably connected with the seeding mechanism 20 so that when the latter is detached the coverer is removed with it. This adaptation of my machine is especially useful where it is driven over fields that have perhaps already been plowed, in which case I would by preference drive the machine lengthwise of the furrows. Or this adaptation of my device may be useful for broadcast sowing, as where any field shows poor results and it is desired to add seed to the stubble without necessarily plowing or harrowing. The fact that the blades are removable and may be replaced by others of different construction, size, shape, and in greater or lesser number, gives the machine a wide range of usefulness which need not be amplified in this specification.

What is claimed as new is:

In a machine of the character described, the combination of a frame including cross bars and side bars, the latter continued to the rear beyond the rearmost cross bar and bent inward to form rearwardly converging handles, an axle journaled in the side bars of said frame, and a superstructure consisting of two arched straps standing over the side bars of the frame, two intermediate and similarly arched straps connecting the cross bars of the frame, and cross bars connecting the tops of all said straps; of a motor mounted on the cross bars of said superstructure directly over said axle, controlling elements for said motor mounted on said handles, connections between them and the motor, a tractor wheel journaled on said axle between said side bars and beneath said intermediate straps, a sprocket wheel fast on said axle beyond one of the endmost arched straps, a driving sprocket wheel fast on the shaft of the motor, and a chain belt connecting said wheels.

In testimony whereof I have hereunto set my hand in presence of two subscribing witnesses.

JOSIAH STARRIETT.

Witnesses:
INA C. TRUE,
WM. H. CANDEE.